United States Patent
Brodie et al.

(10) Patent No.: US 9,703,173 B2
(45) Date of Patent: Jul. 11, 2017

(54) CAMERA MODULE STRUCTURE HAVING ELECTRONIC DEVICE CONNECTIONS FORMED THEREIN

(71) Applicant: Apple Inc., Cupertino, CA (US)

(72) Inventors: Douglas Stuart Brodie, Los Gatos, CA (US); Qiang Yang, Fremont, CA (US); Shaolong Sui, Sunnyvale, CA (US); Takeshi Ichimiya, Wako (JP); Yoshiyuki Takase, Oyama (JP)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/692,614

(22) Filed: Apr. 21, 2015

(65) Prior Publication Data
US 2016/0313628 A1 Oct. 27, 2016

(51) Int. Cl.
*G03B 17/00* (2006.01)
*G03B 3/10* (2006.01)
(Continued)

(52) U.S. Cl.
CPC ............... *G03B 3/10* (2013.01); *G02B 7/006* (2013.01); *G02B 7/02* (2013.01); *G02B 7/09* (2013.01);
(Continued)

(58) Field of Classification Search
CPC ......... G03B 11/00; G03B 17/00; G03B 17/12
(Continued)

(56) References Cited

U.S. PATENT DOCUMENTS 4,054,890 A 10/1977 Shimomura
4,440,072 A 4/1984 Haas, Sr. et al.
(Continued)

FOREIGN PATENT DOCUMENTS

EP 0257675 3/1988
KR 101262878 5/2013
(Continued)

OTHER PUBLICATIONS

Apple Inc., PCT Search Report and Written Opinion mailed Jun. 21, 2016, PCT Appln. No. PCT/US2016/026261, 13 pages.

*Primary Examiner* — Clayton E Laballe
*Assistant Examiner* — Fang-Chi Chang
(74) *Attorney, Agent, or Firm* — Blakely, Sokoloff, Taylor & Zafman LLP

(57) ABSTRACT

A camera module including a camera module carrier having a lens actuator attached thereto and at least two conductive carrier traces that are electrically connected to electrical contact points of the lens actuator. The camera module having a lens barrel connected to the camera module carrier, the lens barrel having a first conductive barrel trace and a second conductive barrel trace formed therein, the first conductive barrel trace and the second conductive barrel trace forming an alternating pattern of first contact regions and second contact regions along a top edge of the lens barrel and being electrically connected to respective ones of the at least two conductive carrier traces such that electrical signals can be routed between the camera module carrier and the lens barrel. The camera module further including an electronic device electrically connected to the lens actuator by the camera module carrier and the lens barrel.

20 Claims, 15 Drawing Sheets

(51) Int. Cl.
  *G02B 7/00* (2006.01)
  *G02B 7/02* (2006.01)
  *G02B 27/64* (2006.01)
  *G02B 7/09* (2006.01)
  *G03B 11/00* (2006.01)
  *H04N 5/225* (2006.01)
  *H02K 41/035* (2006.01)
  *G02F 1/1343* (2006.01)
  *G02B 7/08* (2006.01)

(52) U.S. Cl.
  CPC ..... *G02B 27/646* (2013.01); *G02F 1/134309* (2013.01); *G03B 11/00* (2013.01); *H02K 41/0356* (2013.01); *H04N 5/225* (2013.01); *G02B 7/08* (2013.01)

(58) Field of Classification Search
  USPC ........................................................ 396/532
  See application file for complete search history.

(56) References Cited

U.S. PATENT DOCUMENTS

| | | | |
|---|---|---|---|
| 7,585,122 | B2 | 9/2009 | Eromaki |
| 8,411,193 | B2 | 4/2013 | Chiu |
| 2008/0037143 | A1 | 2/2008 | Yoon |
| 2009/0161239 | A1 | 6/2009 | Verhaar et al. |
| 2009/0213232 | A1* | 8/2009 | Asakura .................. G02B 7/02 348/208.4 |
| 2010/0134866 | A1 | 6/2010 | Foller et al. |
| 2011/0304762 | A1* | 12/2011 | Chiu ........................ G02F 1/29 348/335 |
| 2012/0092543 | A1 | 4/2012 | Afshari et al. |
| 2012/0120298 | A1 | 5/2012 | Chiu et al. |
| 2012/0140101 | A1* | 6/2012 | Afshari ................ H04N 5/2257 348/308 |
| 2013/0016188 | A1 | 1/2013 | Ogasahara |
| 2013/0057757 | A1* | 3/2013 | Ryou ...................... G02B 7/08 348/374 |
| 2013/0215489 | A1 | 8/2013 | Blackburn et al. |
| 2013/0271648 | A1 | 10/2013 | Brodie et al. |
| 2013/0329126 | A1 | 12/2013 | Brodie et al. |
| 2014/0028905 | A1* | 1/2014 | Kim ...................... H04N 5/2257 348/374 |
| 2014/0050469 | A1 | 2/2014 | Song |
| 2016/0088198 | A1* | 3/2016 | An ........................ H04N 5/2252 348/374 |

FOREIGN PATENT DOCUMENTS

| | | | |
|---|---|---|---|
| KR | WO 2013133584 A1 * | 9/2013 | .............. G03B 3/10 |
| KR | 20130136766 | 12/2013 | |
| KR | 1020140007183 | 1/2014 | |
| WO | WO-0049455 | 8/2000 | |
| WO | WO-2013191359 | 12/2013 | |
| WO | WO-2014106276 | 7/2014 | |

* cited by examiner

CAMERA MODULE STRUCTURE HAVING ELECTRONIC DEVICE CONNECTIONS FORMED THEREIN

BACKGROUND

Field

Embodiments related to a camera module having electrical connections for an associated electronic device, more specifically, a camera module carrier and a lens barrel having electrical connections to an electrically activated lens filter.

Background Information

Camera modules are incorporated into a variety of consumer electronics devices, including mobile devices such as smart phones, mobile audio players, personal digital assistants, and other portable and desktop computers. A typical camera module includes an optical system used to collect and transmit light from an imaged scene to an imaging sensor. The optical system generally includes at least one lens associated with one aperture stop. The lens collects and transmits light. The aperture stop limits the light collected and includes an aperture through which light is transmitted. The aperture is therefore termed the stop aperture, or alternatively, the camera pupil. The lens and stop aperture are typically supported within the camera module by a lens barrel. The lens barrel may in turn be mounted to a camera module carrier. The camera module carrier may serve as a support structure for various camera module components such as the lens barrel and an actuator (e.g. a voice coil motor (VCM)) to drive movement of the lens and/or stop aperture associated with the barrel. Representatively, in the case of a VCM actuator, a current may be passed through the electromagnet (coil) creating a magnetic field that is repulsive with respect to the VCM permanent magnets, causing the lens to move along an optical axis away from the image sensor during an auto focus (AF) operation. In addition, the VCM may include springs to provide a restoring force which draws the lens toward the image sensor back to a rest position. The VCM may also be used to, for example, shift or tilt the lens to provide an optical image stabilization (OIS) function. To drive VCM operation, the VCM may be connected to a power source associated with the camera module by wires connected to terminals on the VCM.

SUMMARY

Embodiments describe electrical connections on camera module structures for providing electrical signals to electronic devices associated with a camera module. Representatively, the electrical connections may be formed on a lens barrel and used to provide electrical signals to an electronic device associated with the lens barrel. In still further embodiments, the electrical connections may be formed on a carrier, such as a camera module carrier to which the lens barrel is mounted, to provide electrical signals to the associated electronic device. The electrical connections on the lens barrel and the carrier may be electrically connected together such that the electrical signal passes through the lens barrel and carrier to the electronic device. Representatively, in one embodiment, the lens barrel and carrier are separate structures each having their own pattern of electrical connections such as conductive traces formed on an outer surface. The traces are then electrically connected when the lens barrel and carrier are mounted to one another. In other embodiments, the lens barrel and carrier are one integrally formed structure or unit with continuous traces formed from the lens barrel to the carrier. The traces may be formed using a laser direct structuring (LDS) process or a combination of LDS and another technology such as insert-molding. The electronic device may be any type of electronic device that may be used in connection with a camera module. Representatively, the electronic device may be, for example, an electrically activated lens filter mounted to the lens barrel. Representatively, the lens filter may include an electro-optic portion with a radially symmetric electric field gradient such that filter opacity, which varies with electric field, gradually decreases from an outer rim of the lens filter to an aperture region on either side of a central optical axis.

An embodiment describes a lens barrel for a camera module including a cylindrical support member, the cylindrical support member having an annular sidewall and an open center portion, the annular sidewall having a top edge, a bottom edge, an inner surface defining the open center portion and an outer surface, a flange extending from the inner surface into the open center and a plurality of contact regions formed on the top edge of the annular sidewall. The lens barrel further includes a pattern of conductive traces formed in the cylindrical support member, the pattern of conductive traces having a first trace line and a second trace line extending from the bottom edge to the top edge of the annular sidewall, one of the first trace line or the second trace line being formed around the outer surface of the annular sidewall and extending over the top edge to every other one of the plurality of contact regions within the top edge, and the other of the first trace line or the second trace line being formed around the flange and extending from the flange to a remaining every other one of the plurality of contact regions within the top edge such that contact regions having alternating first trace lines and second trace lines are formed around the top edge.

An embodiment describes a lens barrel for a camera module including a cylindrical support member, the cylindrical support member having an annular sidewall and an open center portion, the annular sidewall having a top edge, a bottom edge, an inner surface defining the open center portion, an outer surface and a plurality of evenly spaced contact regions along a top edge of the annular sidewall. The lens barrel further includes a first conductive trace, the first conductive trace being formed around the outer surface and having a plurality of first conductive trace segments extending from the outer surface to every other one of the evenly spaced contact regions within the top edge and a second conductive trace, the second conductive trace being formed around the inner surface and having a plurality of second conductive trace segments extending from the inner surface to a remaining every other one of the evenly spaced contact regions within the top edge such that the first conductive trace and the second conductive trace are electrically isolated from one another.

An embodiment describes a camera module carrier having a lens actuator attached thereto, the camera module carrier having at least two conductive carrier traces formed therein and electrically connected to at least two electrical contact points of the lens actuator. The module further includes a lens barrel connected to the camera module carrier, the lens barrel having a first conductive barrel trace and a second conductive barrel trace formed therein, the first conductive barrel trace and the second conductive barrel trace forming an alternating pattern of first contact regions and second contact regions along a top edge of the lens barrel and being electrically connected to respective ones of the at least two conductive carrier traces such that electrical signals can be routed between the camera module carrier and the lens barrel. An electronic device may further be positioned on the lens barrel, the electronic device being electrically connected to the lens actuator by the camera module carrier and the lens barrel. In one embodiment, the lens actuator is a voice coil motor having four springs, wherein at least two electrical contact points connected to at least two conductive carrier traces are formed by two of the springs and are operable to route an electrical signal to the electronic device and the remaining electrical contact points are formed by the other two springs and are operable to route an electrical signal to the voice coil motor to drive an auto focus operation or an image stabilization operation of the camera module.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

It should be understood that while some embodiments are described with specific regard to integration within mobile electronic devices, the embodiments are not so limited and certain embodiments may also be applicable to other uses. For example, a lens barrel or camera module as described herein may be incorporated into a device that remains at a fixed location, e.g., a traffic camera, or used in a relatively stationary application, e.g., in a desktop computer, or a motor vehicle.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment", or the like, means that a particular feature, structure, configuration, or characteristic described is included in at least one embodiment. Thus, the appearance of the phrase "one embodiment," "an embodiment", or the like, in various places throughout this specification are not necessarily referring to the same embodiment. Furthermore, the particular features, structures, configurations, or characteristics may be combined in any suitable manner in one or more embodiments.

The use of relative terms throughout the description, such as "top" and "bottom" may denote a relative position or direction. For example, a "top edge", "top end" or "top side" may be directed in a first axial direction and a "bottom edge", "bottom end" or "bottom side" may be directed in a second direction opposite to the first axial direction. However, such terms are not intended to limit the use of the camera module disclosed herein to a specific configuration described in the various embodiments below. For example, a top edge of a camera module or its components (e.g. a lens barrel or carrier) may be directed in any direction with respect to an external environment, including toward an external device housing or toward an imaging sensor within the device housing.

Figure 1:
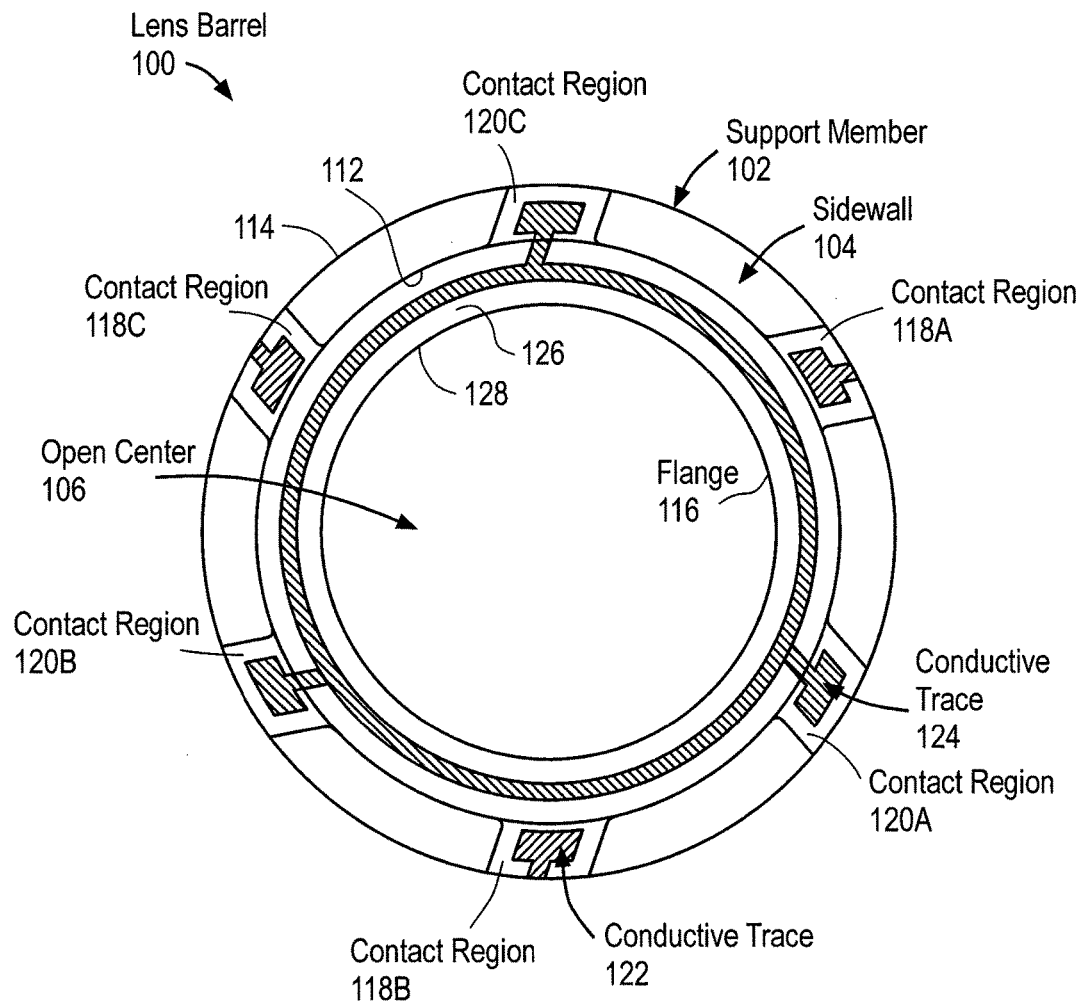
FIG. 1 illustrates a top plan view of a lens barrel in accordance with an embodiment.

Referring to FIG. 1, FIG. 1 is a top plan view of a lens barrel in accordance with an embodiment. Lens barrel 100 may be any type of lens barrel or housing suitable for supporting, for example, a lens, a lens filter, a lens assembly or other lens related electronic component in a camera module. Representatively, lens barrel 100 may include a cylindrical support member 102. The cylindrical support member 102 may be, for example, a plastic or other similarly non-conductive material that can be molded or otherwise formed into a cylindrical structure as disclosed herein. Cylindrical support member 102 may have a sidewall 104 which forms an open center portion 106. Representatively, sidewall 104 may have a top edge 108, a bottom edge 110 and an inner surface 112 which defines the open center portion 106. The open center portion 106 may be dimensioned to contain, for example, a circular or otherwise disk shaped structure therein, for example, a lens or lens filter. In this aspect, the sidewall 104 may have an annular or ring shaped profile such that the open center portion 106 has a circular shape. Cylindrical support member 102 may further include a flange 116 which extends from inner surface 112 into the open center portion 106. In other words, flange 116 may be considered to be an inwardly extending ridge or rim formed around inner surface 112. In this aspect, flange 116 may have a top side 126 and a bottom side 128 which face different axial directions. Flange 116 may be formed around the entire inner surface 112 of sidewall 104 such that it is one continuous structure. Flange 116 may have a ring or annular shape such that it conforms to the shape of the support member inner surface 112.

Contact regions 118A, 118B, 118C, 120A, 120B and 120C may further be formed along sidewall 104. Contact regions 118A-118C and 120A-120C may provide a region for electrical contacts or connections to be made between lens barrel 100 and an electronic device connected to lens barrel 100. In one embodiment, contact regions 118A-118C and 120A-120C are formed within the top edge 108 of sidewall 104. Contact regions 118A-118C and 120A-120C may be evenly spaced around top edge 108. In other words, a distance between adjacent contact regions 118A-118C and 120A-120C is the same. In some embodiments, contact regions 118A-118C and 120A-120C are recesses, grooves, indentations or the like formed within top edge 108 of sidewall 104.

Lens barrel 100, including each of the above-described features, may be formed as a single integrated unit, for example, a molded structure. In this aspect, the outer surface 114 and the inner surface 112 of sidewall 104 are inseparable and flange 116 may also be inseparable from sidewall 104. Still further, lens barrel 100 may be formed from a plastic (e.g. a thermoplastic) or other similar moldable and non-conductive material. In this aspect, electrical connections may be formed within lens barrel 100 to provide electrical signals to its associated components. Representatively, in on embodiment, conductive traces 122, 124 may be formed in sidewall 104. Conductive traces 122 and 124 may be formed in a pattern such that conductive trace 122 is electrically isolated or insulated from conductive trace 124 (such as by the material of sidewall 104). In this aspect, a positive electrical signal may be routed through lens barrel 100 by one of conductive traces 122 or 124 and a negative electrical signal may be routed through lens barrel 100 by the other of conductive traces 122 or 124. Conductive traces 122 and 124 may be patterned such that a positive and negative electrical signal can be routed from the bottom edge 110 to the top edge 108 of sidewall 104. In this aspect, both positive and negative electrical signals can be routed through lens barrel 100 to an electronic device (e.g. an electro-optic lens filter) attached near a top or bottom edge of lens barrel 100.

Representatively, in one embodiment, conductive trace 122 is formed around outer surface 114 of sidewall 104 and conductive trace 124 is formed around inner surface 112 of sidewall 104. In some embodiments, conductive trace 124 is formed around flange 116 along inner surface 112 of sidewall 104. Representatively, conductive trace 124 can be formed along top side 126 of flange 116. It is contemplated, however, that conductive trace 124 may instead be formed along bottom side 126 of flange 116, or directly within inner surface 112. In either case, it is important that conductive trace 122 and conductive trace 124 be electrically isolated from one another such that they can carry a positive signal and a negative signal, respectively, along lens barrel 100. In this aspect, the pattern of conductive traces 122, 124 should be such that they do not intersect one another.

In addition, conductive traces 122 and 124 may have portions which extend into contact regions 118A-118C and 120A-120C. Representatively, in on embodiment, portions of conductive trace 122 may extend into contact regions 118A-118C and portions of conductive trace 124 may extend into contact regions 120A-120C. Each of contact regions 118A-118C may alternate with contact regions 120A-120C. In this aspect, where conductive trace 122 carries a positive signal and conductive trace 124 carries a negative signal, a pattern of alternating positive contact regions 118A-118C and negative contact regions 120A-120C may be formed around the top edge 108 of sidewall 104. Contact regions 118A-118C and contact regions 120A-120C may be evenly spaced around top edge 108 such that the pattern of contact regions 118A-118C, 120A-120C around lens barrel 100 is substantially symmetrical. Said another way, there is an even distance between adjacent contact regions 118A-118C, 120A-120C.

Conductive traces 122 and 124 may be formed within portions of sidewall 104, for example, using a laser direct structuring (LDS) technique. Representatively, sidewall 104 may be made of a thermoplastic material that is doped with a metal-plastic additive. A laser may then be used to pattern or write conductive traces 122 and 124 on the plastic. More specifically, as the laser beam contacts the plastic, the metal additive forms a track and the track forms the nuclei for the subsequent metallization. In one embodiment, the track is then exposed to, for example, an electroless copper bath and the conductor path layers rise within the tracks to form conductive traces 122 and 124. Additional metallic layers (e.g. nickel or gold) can also be raised this way to form successive metallic layers. Although an LDS process for forming conductive traces 122 and 124 is described, it should be understood that other molding techniques, or a combination of molding techniques, may be used to form conductive traces 122 and 124 in the desired pattern on sidewall 104. For example, an insert molding technique, or a combination of insert molding and LDS, may be used to form a portion of, or all of, conductive traces 122 and 124 within sidewall 104.

Figure 2:
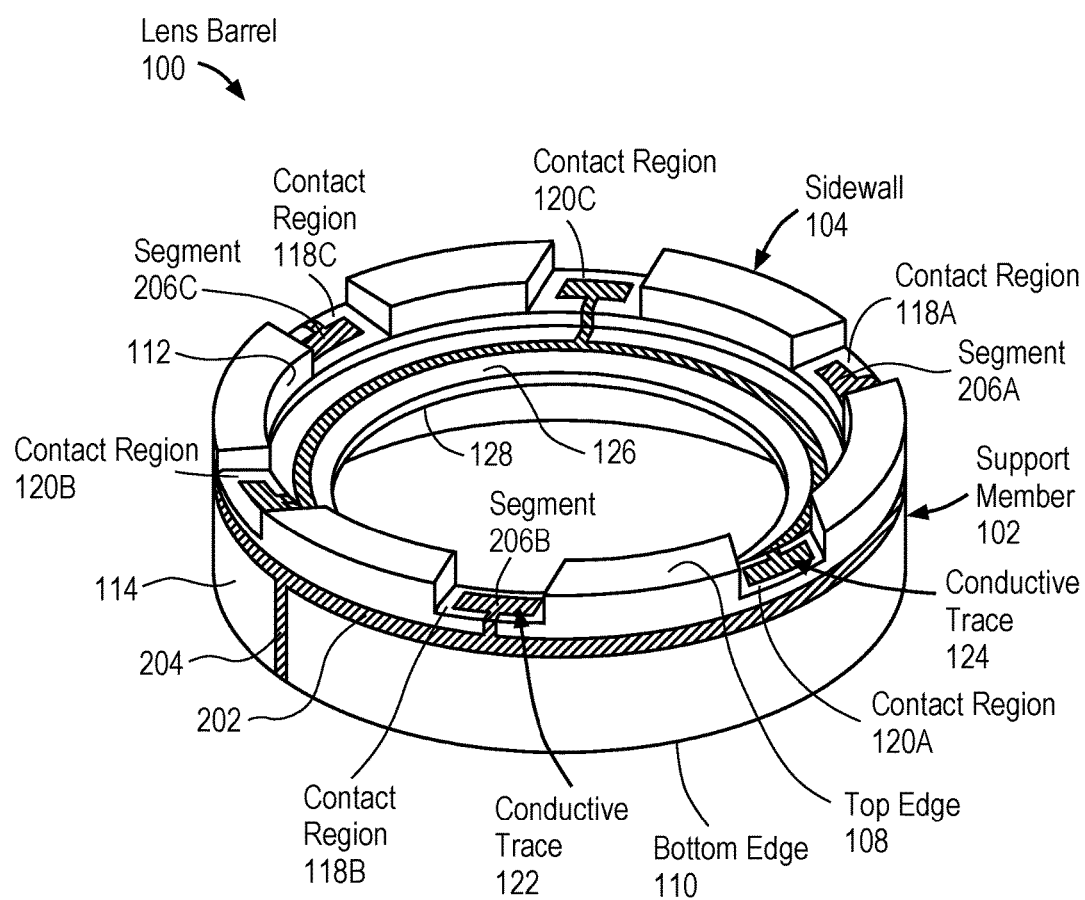
FIG. 2 illustrates a front perspective view of the lens barrel of FIG. 1 in accordance with an embodiment.
Figure 3:
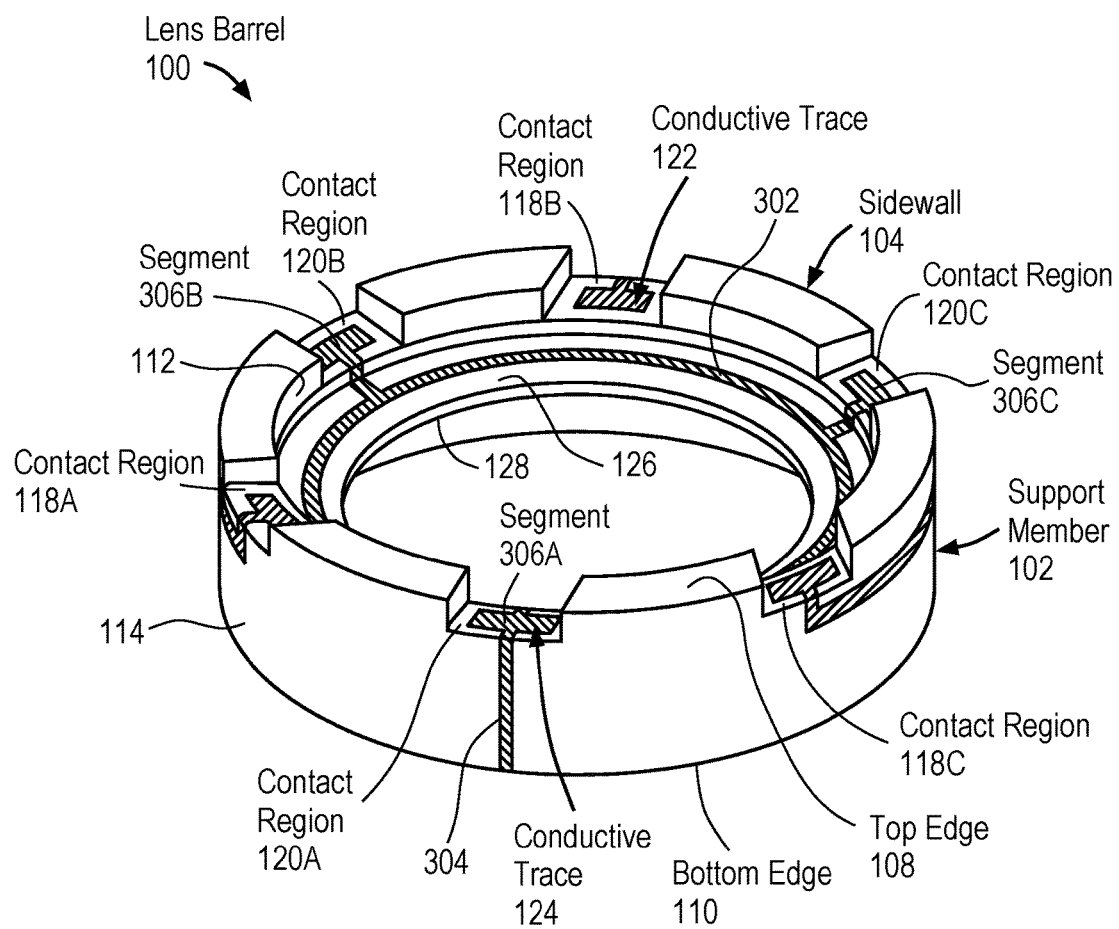
FIG. 3 illustrates a back perspective view of the lens barrel of FIG. 2 in accordance with an embodiment.

The pattern of conductive traces 122 and 124 around lens barrel 100 can be more clearly seen in the perspective views of lens barrel 100 illustrated in FIG. 2 and FIG. 3.

Representatively, FIG. 2 and FIG. 3 illustrate front and back perspective views of lens barrel 100 having conductive traces 122 and 124. In particular, FIG. 3 is a view of the lens barrel in FIG. 2 rotated approximately 180 degrees.

FIG. 2 illustrates alternating contact regions 118A-118C and 120A-120C being formed by ridges within top edge 108 of sidewall 104. Conductive trace 122 is in turn patterned such that it extends from the bottom edge 110 to each of contact regions 118A-118C in the top edge 108 of sidewall 104. In one embodiment, conductive trace 122 includes a ring portion 202 which extends around (i.e. forms a ring around) outer surface 114 of sidewall 104. Ring portion 202 may be formed near the top edge 108 as shown, or could be formed in the middle, or near the bottom edge 110 of sidewall 104. A connecting portion 204 may be formed from ring portion 202 to the bottom edge 110 of sidewall 104. The connecting portion 204 may serve to connect ring portion 202 to an electrical contact or conductive trace on a structure upon which lens barrel 100 is positioned. In some embodiments, connection portion 204 may be a substantially vertically extending trace section that is aligned substantially parallel to the barrel axis.

Conductive trace 122 may further include trace segments 206A, 206B and 206C that extend from ring portion 202 into contact regions 118A, 118B and 118C, respectively. In this aspect, the electrical signal carried by ring portion 202 may be distributed to each of contact regions 118A-118C. Thus, for example, if the electrical signal is a positive signal, each of contact regions 118A-118C may be considered positive contact regions. In addition, trace segments 206A-206C may be considered inwardly extending, or forming an outside-in pattern, in that they extend from ring portion 202 along the outer surface 114 of sidewall 104 toward open center portion 106. Each of trace segments 206A-206C may terminate within contact regions 118A-118C and form electrical contact points for an electronic device positioned on top edge 108 of lens barrel 100. In some embodiments, the ends of trace segments 206A-206C within contact regions 118A-118C may have a greater width than other portions of conductive trace 122 such that an electrical contact having a maximum surface area is formed within contact regions 118A-118C. Representatively, trace segments 206A-206C may have a substantially "T" shaped profile.

FIG. 3 shows a pattern of conductive trace 124. In particular, from this view, it can be seen that conductive trace 124 is patterned such that it extends from the bottom edge 110 to each of contact regions 120A-120C in the top edge 108 of sidewall 104. In one embodiment, conductive trace 124 includes a ring portion 302 which extends around (i.e. forms a ring around) inner surface 112 of sidewall 104. More specifically, ring portion 302 is formed within top side 126 of flange 116. Ring portion 302 may however, in some embodiments, be formed around bottom side 128 of flange 116, or directly within inner surface 112.

Conductive trace 124 may further include trace segments 306A, 306B and 306C that extend from ring portion 302 formed in flange 116 into contact regions 120A, 120B and 120C, respectively. In this aspect, the electrical signal carried by ring portion 302 may be distributed to each of contact regions 120A-120C. Thus, for example, if the electrical signal carried by conductive trace 124 is a negative signal, each of contact regions 120A-120C may be considered to have a negative signal and therefore be referred to as negative contact regions. In this aspect, where conductive trace 122 carries a positive signal as previously discussed, alternating positive contact regions 118A-118C and negative contact regions 120A-120C are formed around the top edge of sidewall 104. Because the positive and negative contact regions 118A-118C and 120A-120C may be distributed evenly around top edge 108 they can provide symmetric and/or uniform distribution of electric fields or signals around top edge 108, and to an electronic device connected thereto. In addition, trace segments 306A-306C may be considered outwardly extending, or forming an inside-out pattern, in that they extend from ring portion 302 along the inner surface 112 of sidewall 104 toward outer surface 114. Each of trace segments 306A-306C may terminate within contact regions 120A-120C and form electrical contact points for an electronic device positioned on lens barrel 100. In some embodiments, the ends of trace segments 306A-306C within contact regions 120A-120C may have a greater width than other portions of conductive trace 124 such that an electrical contact having a maximum surface area is formed within contact regions 120A-120C. Representatively, trace segments 306A-306C may be considered as having a "T" shaped profile.

A connecting portion 304 may be formed from ring portion 302 to bottom edge 110 of sidewall 104. Representatively, connecting portion 304 may be connected to and extend from one of the ends of trace segments 306A-306C over top edge 108 and along outer surface 114 of sidewall 104. In this aspect, similar to connecting portion 204, connecting portion 304 is formed along the outer surface 114 of sidewall 104, except at a different position. For example, connecting portion 304 may be formed along a portion of sidewall 104 diametrically opposed to that of connecting portion 204. The connecting portion 304 may serve to connect ring portion 302 to an electrical contact or conductive trace on a structure upon which lens barrel 100 is positioned. In some embodiments, connecting portion 304 may be a substantially vertically extending trace section that is aligned substantially parallel to the barrel axis. In addition, although connecting portion 204 and connecting portion 304 are shown formed along the outer surface 114 of sidewall 104, they may both be formed along the inner surface 112 or one formed along the inner surface 112 and one formed along the outer surface 114. It should be understood, however, that connecting portions 204, 304 are formed along the same sidewall 104, in other words, they are not formed on walls associated with different, separable structures.

In addition, it should be understood that because the pattern of conductive trace 122 is formed substantially around outer surface 114 of sidewall 104 (i.e. an outside-in pattern) while that of conductive trace 124 is formed substantially around inner surface 112 of sidewall (i.e. an inside-out pattern) the two patterns do not intersect and may be considered electrically isolated from one another and therefore able to carry positive and negative signals to an electronic device connected to lens barrel. In particular, an electrical connection to an electronic device having more than two terminal pads or electrodes can be made. For example, the pattern of conductive traces 122, 124 may be such that electrical connections can be made to an electronic device having four, six, eight, ten, twelve or more terminal pads or electrodes.

Figure 4:
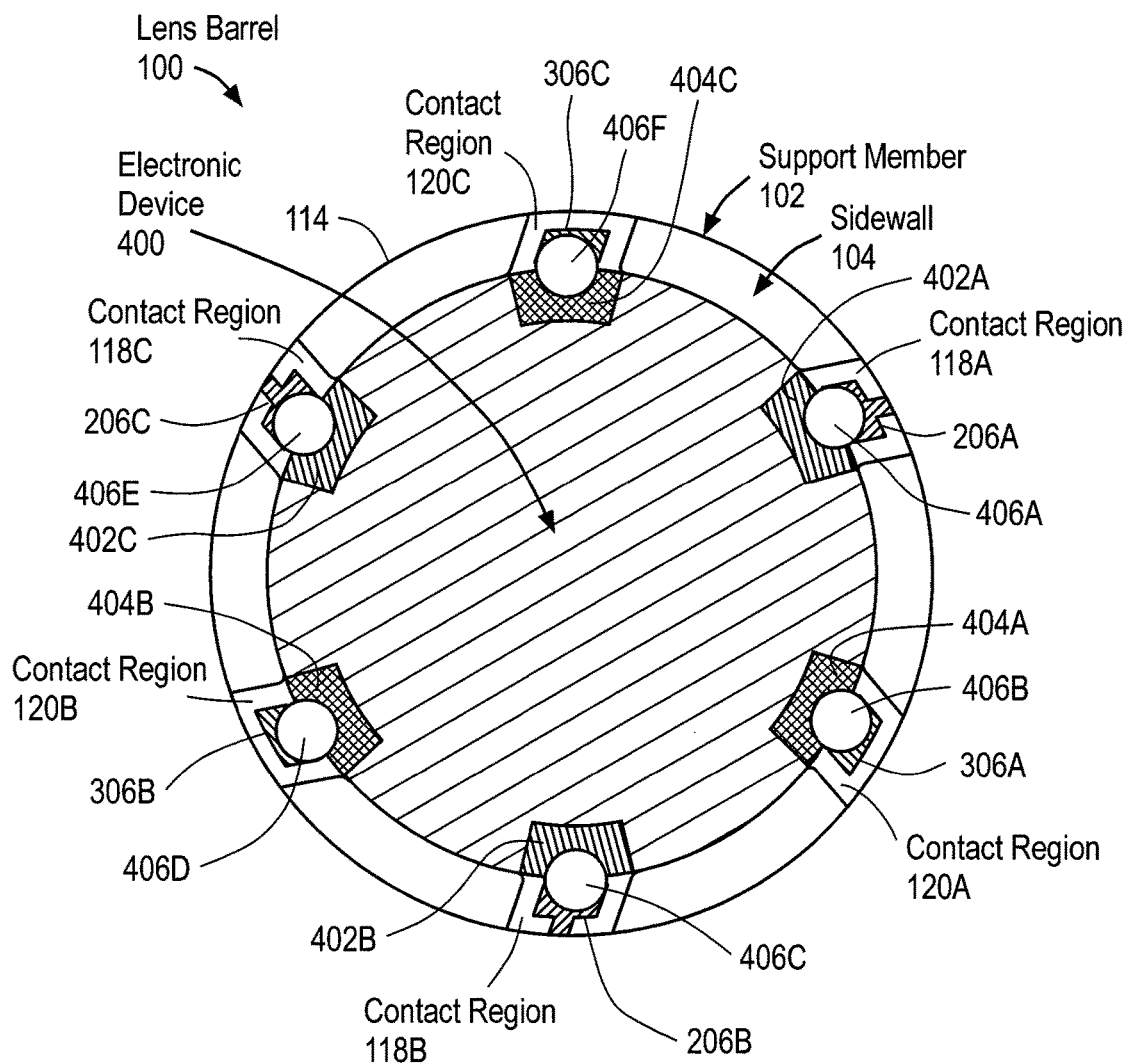
FIG. 4 illustrates a top view of an embodiment of an electronic device having multiple terminal pads connected to the lens barrel of FIGS. 1-3.

FIG. 4 illustrates a top view of an electronic device having multiple terminal pads connected to the lens barrel of FIGS. 1-3. Representatively, electronic device 400 may be a circular or disk shaped electronic device (e.g. have a circular profile), for example, an electro-optic lens filter having a plurality of terminal pads or electrodes 402A, 402B, 402C and 404A, 404B, 404C arranged in a circumferential pattern along its outer circumference or rim. Electrodes 402A-402C and 404A-404C may be distributed around the device outer rim to provide symmetric and/or uniform distribution of electric field in a circumferential direction. That is, since electrodes 402A-402C and 404A-404C may be equally spaced around the outer rim, application of a same voltage to each electrode may produce a circumferentially symmetric voltage distribution or electric field within electronic device 400. In one embodiment, electrodes 402A-402C may be considered positive electrodes and electrodes 404A-404C may be considered negative electrodes. Electrodes 402A-402C may be arranged in an alternating pattern with electrodes 404A-404C such that an alternating positive and negative electrode configuration is formed around the rim of electronic device 400.

As illustrated in FIG. 4, when electronic device 400 is positioned within lens barrel 100, electrodes 402A-402C are aligned with contact regions 118A-118C, respectively, and electrodes 404A-404C are aligned with contact regions 120A-120C, respectively. Each of the electrodes 402A-402C may be electrically connected to trace segments 206A-206C of conductive trace 122 terminating in contact regions 118A-118C. Similarly, each of electrodes 404A-404C may be electrically connected to the trace segments 306A-306C of conductive trace 124 terminating in contact regions 120A-120C. Electrodes 402A-402C and 404A-404C may be electrically connected to contact regions 118A-118C and 120A-120C, respectively, using respective ones of connectors 406A, 406B, 406C, 406D, 406E and 406F. Connectors 406A-406F may be, for example, a conductive epoxy or solder pad such that they form a connecting pad which electrically connects electrodes 402A-402C, 404A-404C with trace segments 206A-206C, 306A-306C in contact regions 118A-118C, 120A-120C.

Figure 5A:
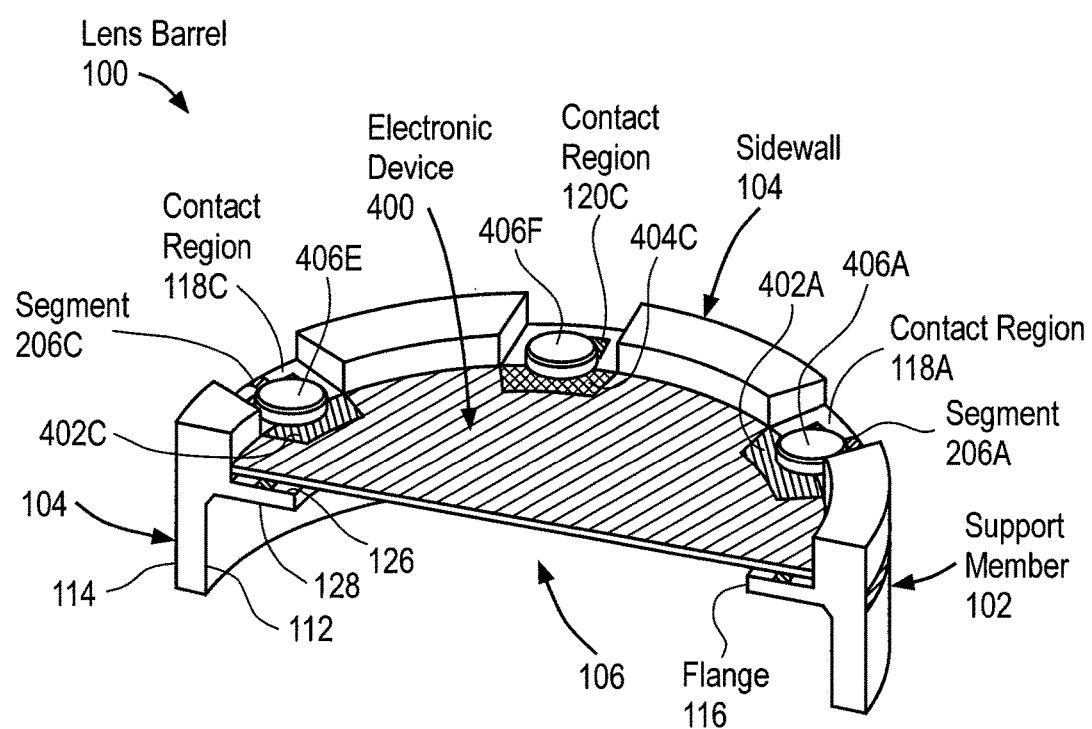
FIG. 5A illustrates a cut out perspective view of an embodiment of the electronic device and lens barrel of FIG. 4.

FIG. 5A illustrates a cut out perspective view of the electronic device and lens barrel of FIG. 4. From this view, the extension of flange 116 from sidewall 104 can be more clearly seen. In particular, it can be seen that flange 116 extends substantially perpendicularly from the inner surface 112 of sidewall 104. Flange 116 includes a top side 126 and a bottom side 128. Conductive trace 124 may be formed around the top side 126 of flange 116. Flange 116 may be formed a distance from the top edge 108 of sidewall 104 such that a pocket for receiving the electronic device 400 is formed within the open center portion 106. In this aspect, electronic device may be positioned within lens barrel 100 such that it is over flange 116 and a top surface of electronic device 400 may be substantially level with contact regions 118A-118C and 120A-120C.

Figure 5B:
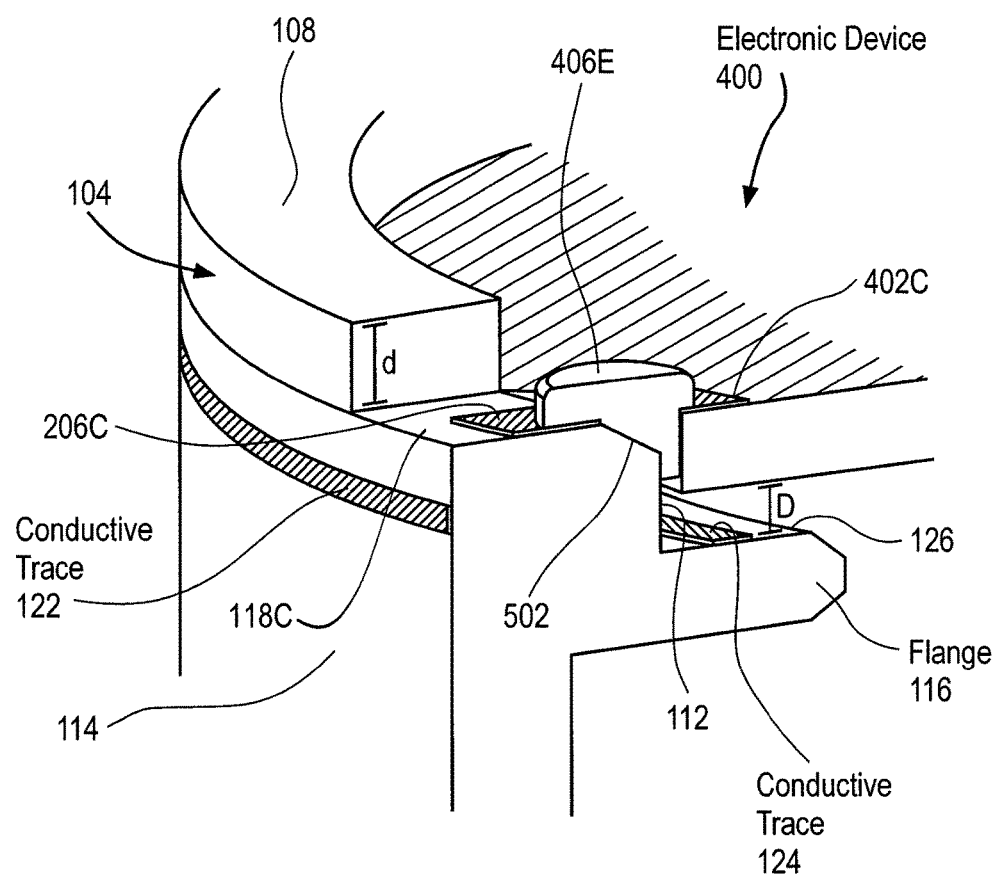
FIG. 5B illustrates a magnified perspective view of a lens barrel contact region of FIG. 5A.

FIG. 5B illustrates a magnified view of the contact region of FIG. 5A. Representatively, from this view, it can be seen that contact region 118C may be a recessed region having a chamfered inner corner 502. The chamfered inner corner 502 may be formed along the inner surface 112 side of sidewall 104 such that it interfaces with the electronic device 400. In this aspect, chamfered inner corner 502 may allow for a larger, more engaged surface with connector 406E, and in turn, better electrical connection between electrode 402C and conductive trace segment 206C within contact region 118C. In addition, contact region 118C is recessed to a depth (d) such that the base portion of the recess (within which conductive trace segment 206C is formed) is between the top edge 108 of sidewall 104 and flange 116. In this aspect, connector 406E fits within contact region 118C and does not extend above the top edge 108 of sidewall 104. Representatively, a depth (d) of contact region 118C may be from about 0.1 mm, 0.13 mm, 0.15 mm, 0.18 mm, 0.2 mm, 0.23 mm, 0.25 mm or more. Contact region 118C may further have a length and/or width which is greater than a diameter of connector 406E such that connector 406E can be placed within contact region 118C without contacting the sides of contact region 118C. Still further, it should be understood that electronic device 400 is spaced a distance (D) from the top side 126 of flange 116 such that electronic device 400 is suspended above, and does not make contact with, the ring portion 302 of conductive trace 124 formed around flange 116. It should also be understood that although the specific features of contact region 118C are described with respect to FIG. 5B, each of the contact regions 118A-118B and 120A-120C may be substantially similar and therefore the description with respect to contact region 118C should be understood as applying to each of 118A-118B and 120A-120C.

Figure 6:
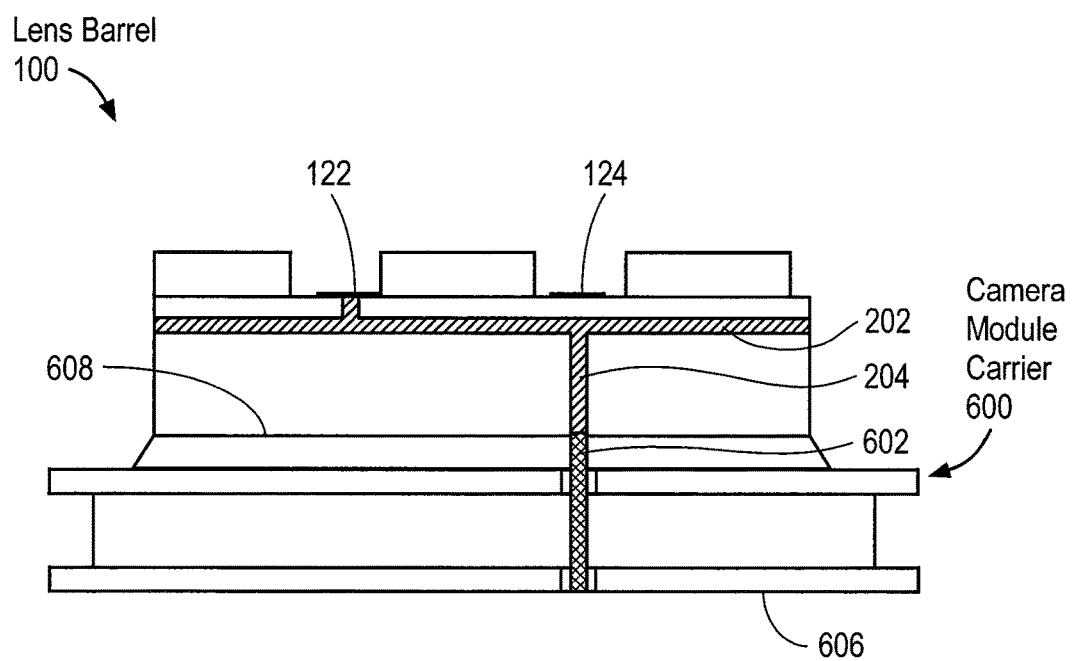
FIG. 6 illustrates a side view of a lens barrel connected to a camera module carrier in accordance with an embodiment.

FIG. 6 illustrates a side view of one embodiment of a lens barrel connected to a camera module carrier. Lens barrel 100 may include each of the previously discussed features, including conductive trace 122 having ring portion 202 and connecting portion 204. Lens barrel 100 may be mounted, or otherwise connected to, a camera module carrier 600. Camera module carrier 600 may be any type of carrier that can be used to support various camera module components, for example, a lens barrel and associated lenses, filters or other electronic devices. To facilitate an electrical connection between lens barrel 100 and camera module carrier 600 and its related components, camera module carrier may include one or more of a conductive carrier trace 602, for example, two conductive carrier traces, formed in its outer surface. Conductive carrier trace 602 may be formed from the bottom side 606 to the top side 608 of camera module carrier 600 such that an electrical connection can be routed from the bottom to the top of camera module carrier 600.

Conductive carrier trace 602 may be formed according to any of the previously discussed methods, including but not limited to an LDS technology or insertion molding technique or a combination of LDS and insertion molding. Conductive carrier trace 602 may be formed such that it can be electrically connected with conductive trace 122 or 124 of lens barrel 100. In this view, conductive carrier trace 602 is shown aligned with, and electrically connected to conductive trace 122. An electrical connection may be accomplished by aligning and positioning trace 122 on carrier trace 602 or a solder or epoxy pad applied between the two.

Figure 7:
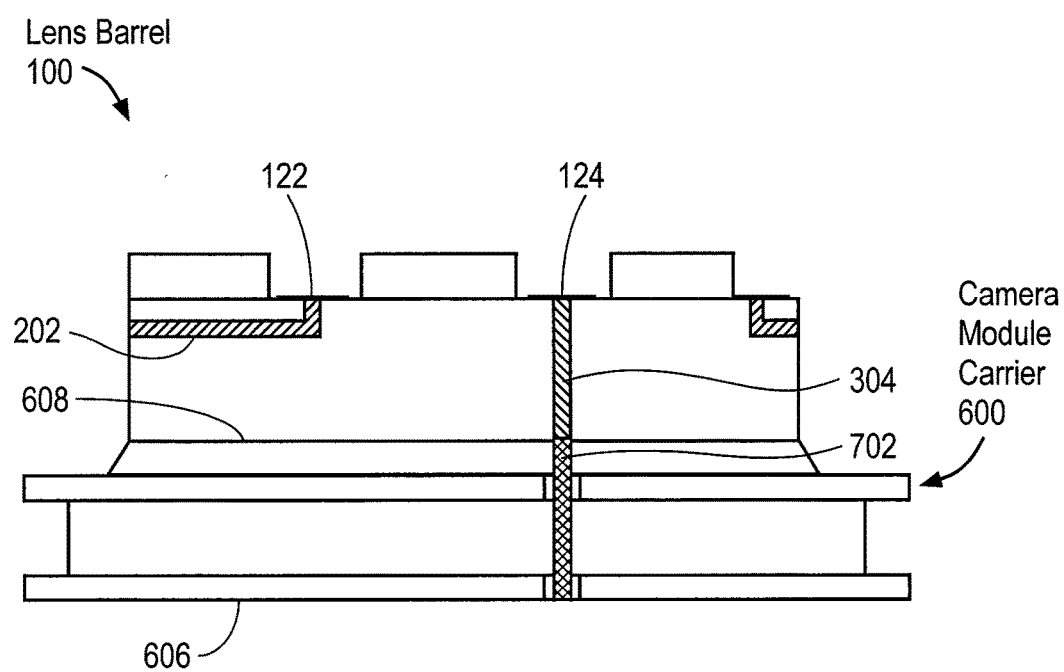
FIG. 7 illustrates a perspective view of the lens barrel and camera module carrier of FIG. 6, rotated 180 degrees.

As seen in FIG. 7, which is a perspective view of the same camera module carrier of FIG. 6, rotated 180 degrees, a second conductive carrier trace 702 may be formed along the other side of camera module carrier 600. From this view, it can be seen that the second conductive carrier trace 702, which is similar to conductive carrier trace 602 except that it is formed on the other side, is connected to the connecting portion 304 of conductive trace 124.

Figure 8:
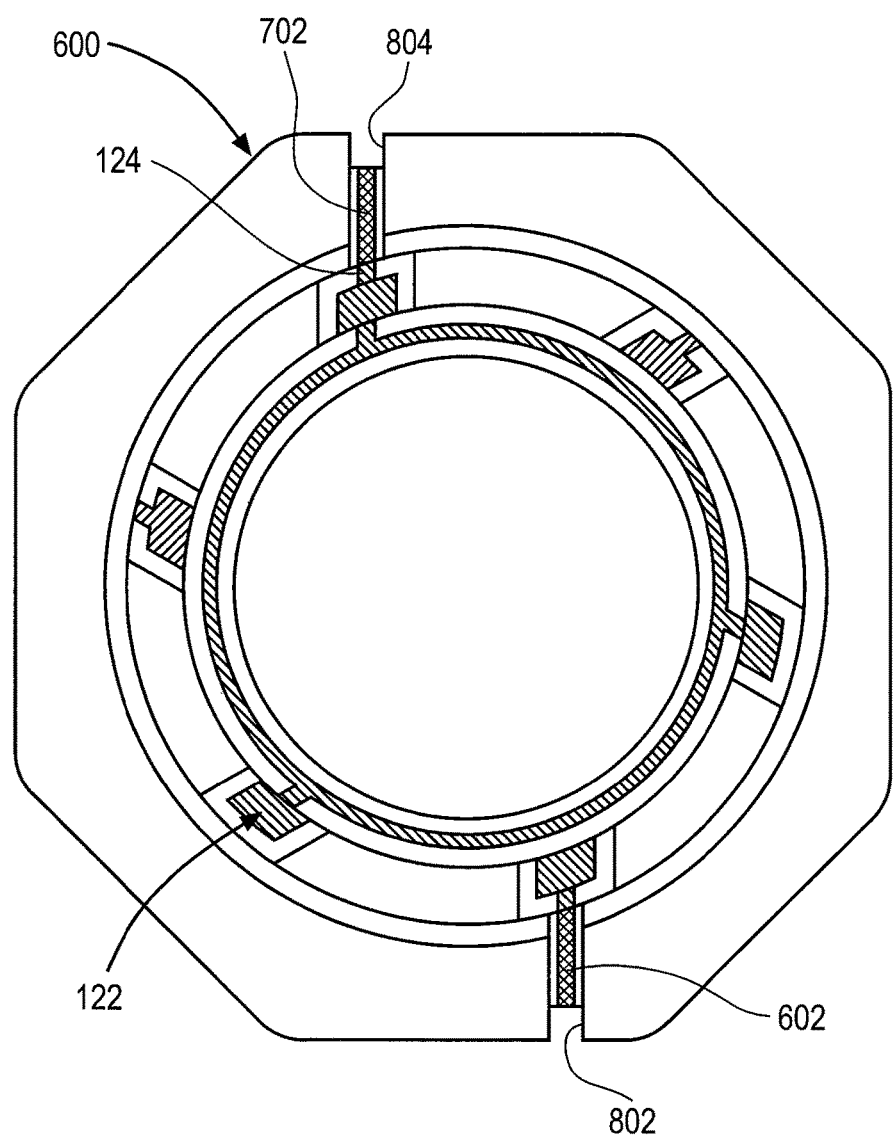
FIG. 8 illustrates a top perspective view of the lens barrel and camera module carrier of FIGS. 6-7 in accordance with an embodiment.

FIG. 8 illustrates a top perspective view of the lens barrel and camera module carrier of FIGS. 6-7. From this view, it can be seen that conductive carrier trace 602 and conductive carrier trace 702 are formed on opposite sides of camera module carrier 600 (i.e. they are diametrically opposed to one another) such that they can be aligned with, and electrically connected to, conductive traces 122 and 124 of the lens barrel 100. In this aspect, an electrical connection can be routed from one end (e.g. a bottom end) of the camera module carrier 600 to another end (e.g. a top end) of the lens barrel 100 to provide an electrical connection to an electronic device connected to the lens barrel 100 (e.g. an opto-electric lens filter or electrically activated lens filter). In addition, it should be understood that in some embodiments, conductive carrier traces 602, 702 are formed within channels 802, 804, respectively, cut into the outer surface of camera module carrier 600. Channels 802, 804 may allow, for example, for the conductive carrier traces 602, 702 to run behind (or between) other components positioned around camera module carrier 600 (e.g. a voice coil motor).

Figure 9:
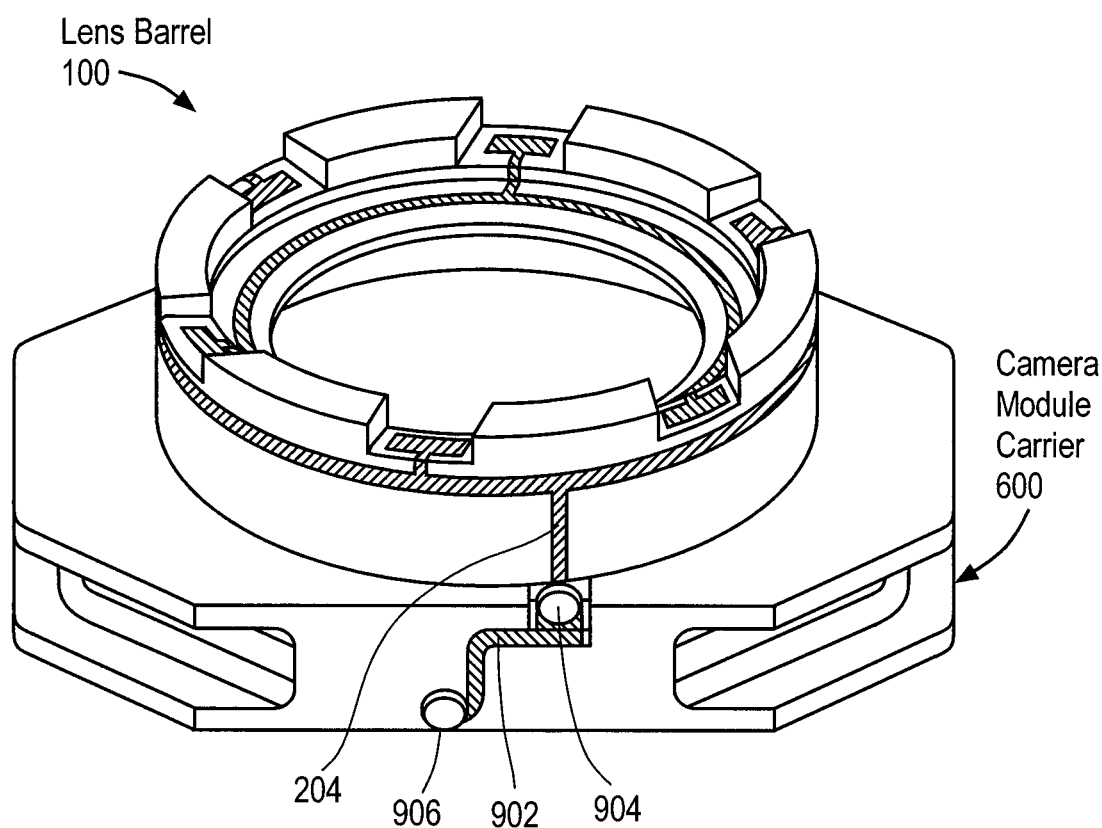
FIG. 9 illustrates a perspective cut out view of another embodiment of a lens barrel connected to a camera module carrier in accordance with an embodiment.

FIG. 9 illustrates a perspective cut out view of another embodiment of a lens barrel connected to a camera module carrier. Lens barrel 100 and camera module carrier 600 are substantially the same as those discussed in reference to FIGS. 6-7 except in this embodiment, instead of conductive carrier trace 602 (and conductive carrier trace 702 not shown) being formed within the outer surface of camera module carrier 600 (such as by an LDS technology), trace 602 (and possibly trace 702) is formed through the camera module carrier 600 using an insertion molding technique. In particular, as can be seen from the cut out portion of FIG. 9, conductive carrier trace 902 is formed through camera module carrier 600 and has ends 904, 906 which extend out the surface of camera module carrier 600 for electrical connection to the lens barrel conductive trace connecting portion 204 at the top of the carrier 600 and perhaps an electronic device at the bottom of carrier 600, such as by applying an epoxy or solder pad between the two.

Figure 10A:
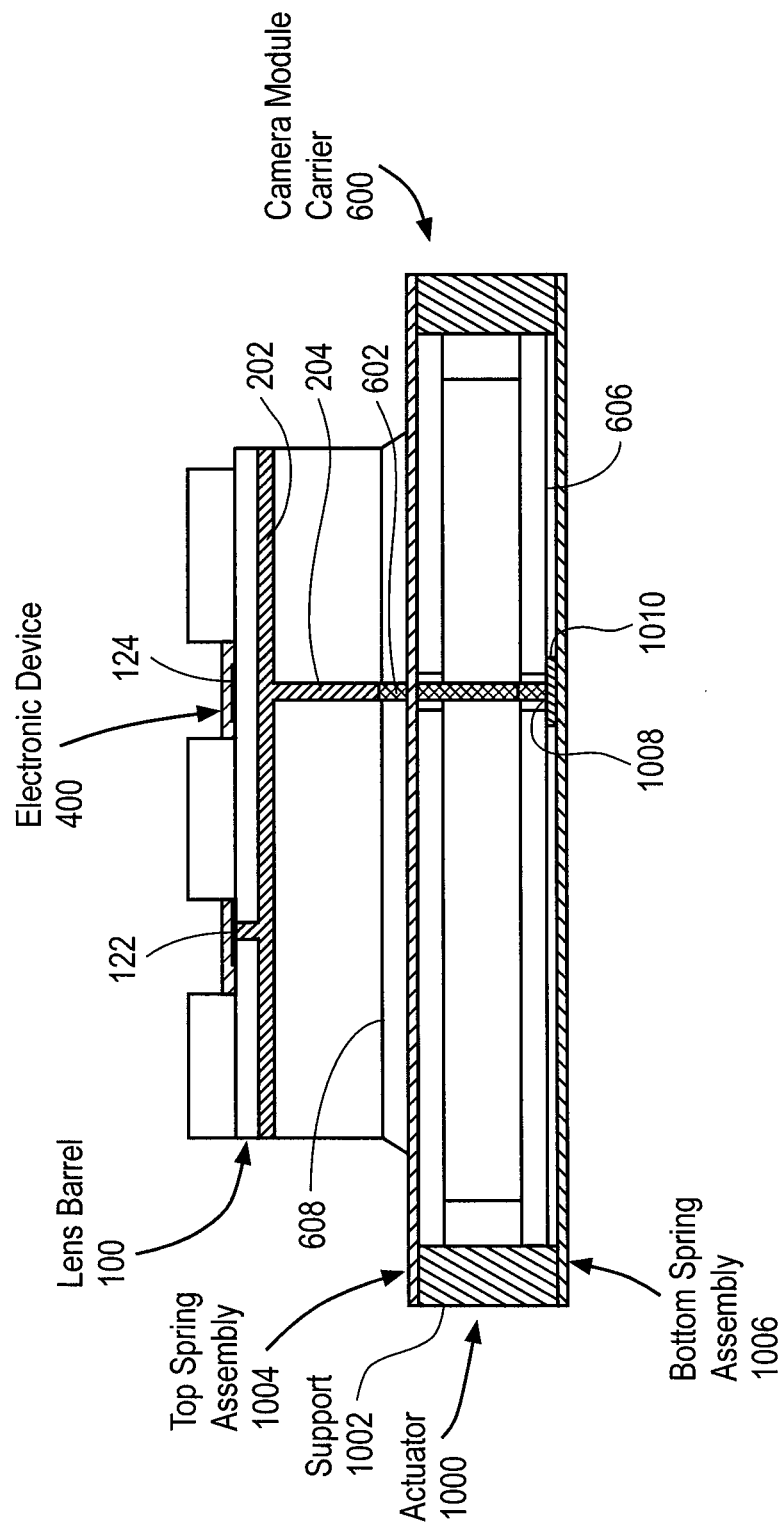
FIG. 10A illustrates a side view of a lens barrel and a camera module carrier electrically connected to an actuator in accordance with an embodiment.

FIG. 10A illustrates a side view of a lens barrel and camera module carrier electrically connected to an actuator according to one embodiment. Representatively, lens barrel 100 and camera module carrier 600 are substantially similar to those previous discussed in reference to FIGS. 1-9. FIG. 10A includes the additional feature of an actuator 1000 electrically connected to the camera module carrier 600 and lens barrel 100. Actuator 1000 may, for example, be a voice coil motor (VCM) that is used to drive an auto focus (AF) or an optical image stabilization (OIS) operation of the camera module. In this aspect, actuator 1000 may include a support member 1002 positioned around camera module carrier 600, a top spring assembly 1004 mounted to a top side of support member 1002 and a bottom spring assembly 1006 mounted to a bottom side of support member 1002. A coil (not shown) may further be wrapped around the camera module carrier 600, between the top spring assembly 1004 and the bottom spring assembly 1006, to help drive an AF or OIS movement of, for example, a lens within lens barrel 100. The top spring assembly 1004 and the bottom spring assembly 1006 may be connected to a power source to help provide power to the actuator components (e.g. an electromagnet within the VCM).

Figure 10B:
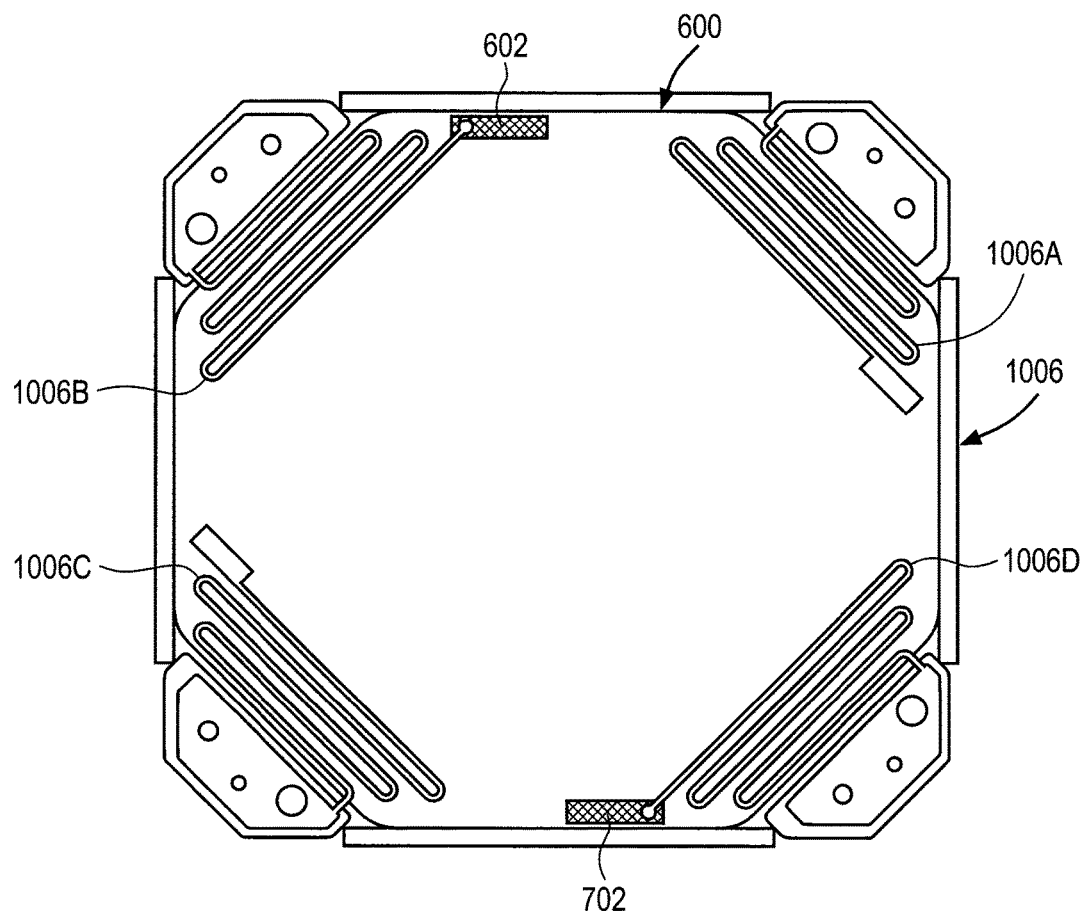
FIG. 10B illustrates a bottom view of the camera module carrier and actuator of FIG. 10A.

One of the top spring assembly 1004 or the bottom spring assembly 1006 may provide an electrical contact point which is electrically connected to the conductive carrier trace 602 to provide an electrical signal to the electronic device 400 attached to the lens barrel 100 as previously discussed. Representatively, in one embodiment, the bottom end 1008 of conductive carrier trace 602 is electrically connected to a conductive contact point 1010 (e.g., a terminal pad) associated with the bottom spring assembly 1006, such as by an epoxy or solder bump formed between the two. In this aspect, when an electrical signal is applied to the bottom spring assembly 1006, the signal is routed through conductive carrier trace 602 and conductive trace 122 of lens barrel 100 to the associated electronic device 400. Still further it is contemplated that in some embodiments, bottom spring assembly 1006 may include four springs 1006A, 1006B, 1006C and 1006D as shown in FIG. 10B, which is a bottom view of the assembly of FIG. 10A. Each of springs 1006A-1006D may be electrically isolated from one another and therefore capable of carrying different electrical signals. Thus, for example, two of springs 1006A, 1006C may be electrically connected to actuator 1000 to drive an AF or OIS operation, while the remaining two springs 1006B, 1006D may provide a contact point for an electrical connection to conductive carrier traces 602, 702, respectively, such that an electrical signal can be routed to the electronic device 400 connected to lens barrel 100. In this aspect, both an AF operation and electronic device 400 operation can be accomplished using components of an actuator 1000 already associated with the camera module carrier 600. Said another way, two or more electrical signals that are not otherwise used to power actuator 1000 (e.g. for an AF or OIS operation) can be routed through lens barrel 100 to electronic device 400 using actuator 1000.

Figure 11:
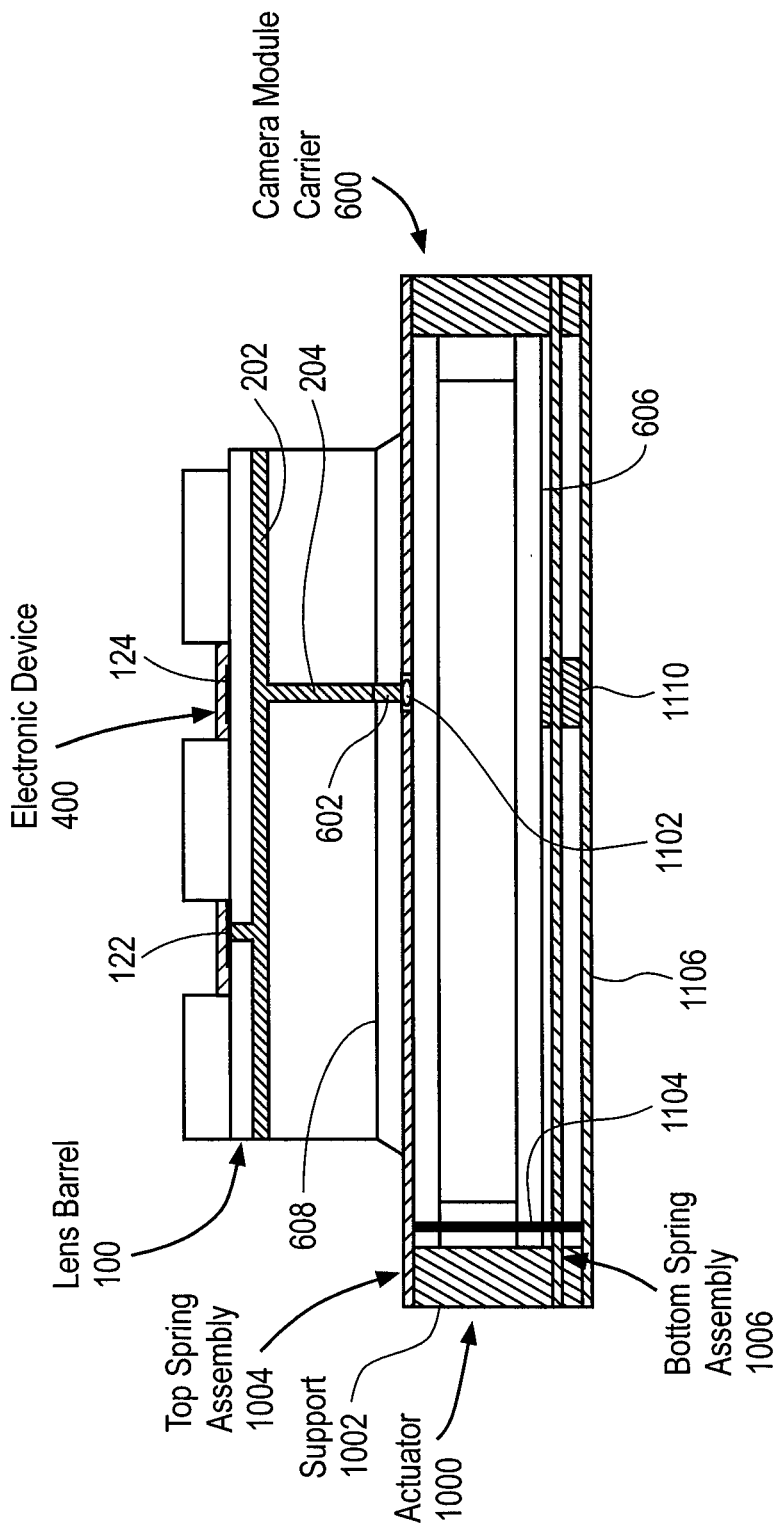
FIG. 11 illustrates a side view of a lens barrel and camera module carrier electrically connected to an actuator according to one embodiment.

FIG. 11 illustrates a side view of a lens barrel and camera module carrier electrically connected to an actuator according to one embodiment. Representatively, lens barrel 100, camera module carrier 600 and actuator 1000 are substantially similar to those previous discussed in reference to FIGS. 1-10B. In this embodiment, however, instead of electrically connecting conductive trace 122 to the bottom spring assembly 1006, which is typically used for an AF operation, conductive trace 122 is electrically connected to the top spring assembly 1004, which may be used for an OIS operation. In particular, similar to bottom spring assembly 1006, top spring assembly 1004 may include four electrically isolated springs. In this aspect, although a detailed view of top spring assembly 1004 is not illustrated, it should be understood that top spring assembly 1004 may include similar features to bottom spring assembly 1006 illustrated in FIG. 10B. Two of the springs of top spring assembly 1004 may be connected to conductive trace 122 (and conductive trace 124), such as by an epoxy or solder pad 1102, to provide an electrical signal to electronic device 400 while the other of the two springs may be electrically connected to actuator 1000 to drive an OIS operation. In addition, an OIS wire 1104 may be electrically connected from top spring assembly 1004 to terminal 1110 along the bottom side 606 of camera module carrier 600. For example, OIS wire 1104 may be electrically connected (e.g. by soldering or conductive adhesion) to top spring assembly 1004 at one end and electrically connected (e.g. by soldering of conductive adhesion) to a conductive plate 1106, which is positioned near the bottom side 606 of camera module carrier 600, at another end. The conductive plate 1106 may be a metal structure which is part of, or otherwise electrically connected to, terminal 1110 near bottom side 606, such that plate 1106 electrically connects OIS wire 1104 to terminal 1110 at the bottom side 606. Although conductive plate 1106 is disclosed, it is contemplated that there may be other ways of electrically connecting OIS wire 1104, and in turn traces 122, 124, to terminal 1110, such as by directly attaching OIS wire 1104 to terminal 1110 and/or solder pad 1102. In this aspect, an electrical signal can run from terminal 1110 near the bottom side 606 of camera module carrier 600 to electronic device 400 on top of lens barrel 100, via the conductive traces 122, 124. In this aspect, the laser direct structuring (LDS) techniques disclosed herein can be applied to an OIS system.

Figure 12:
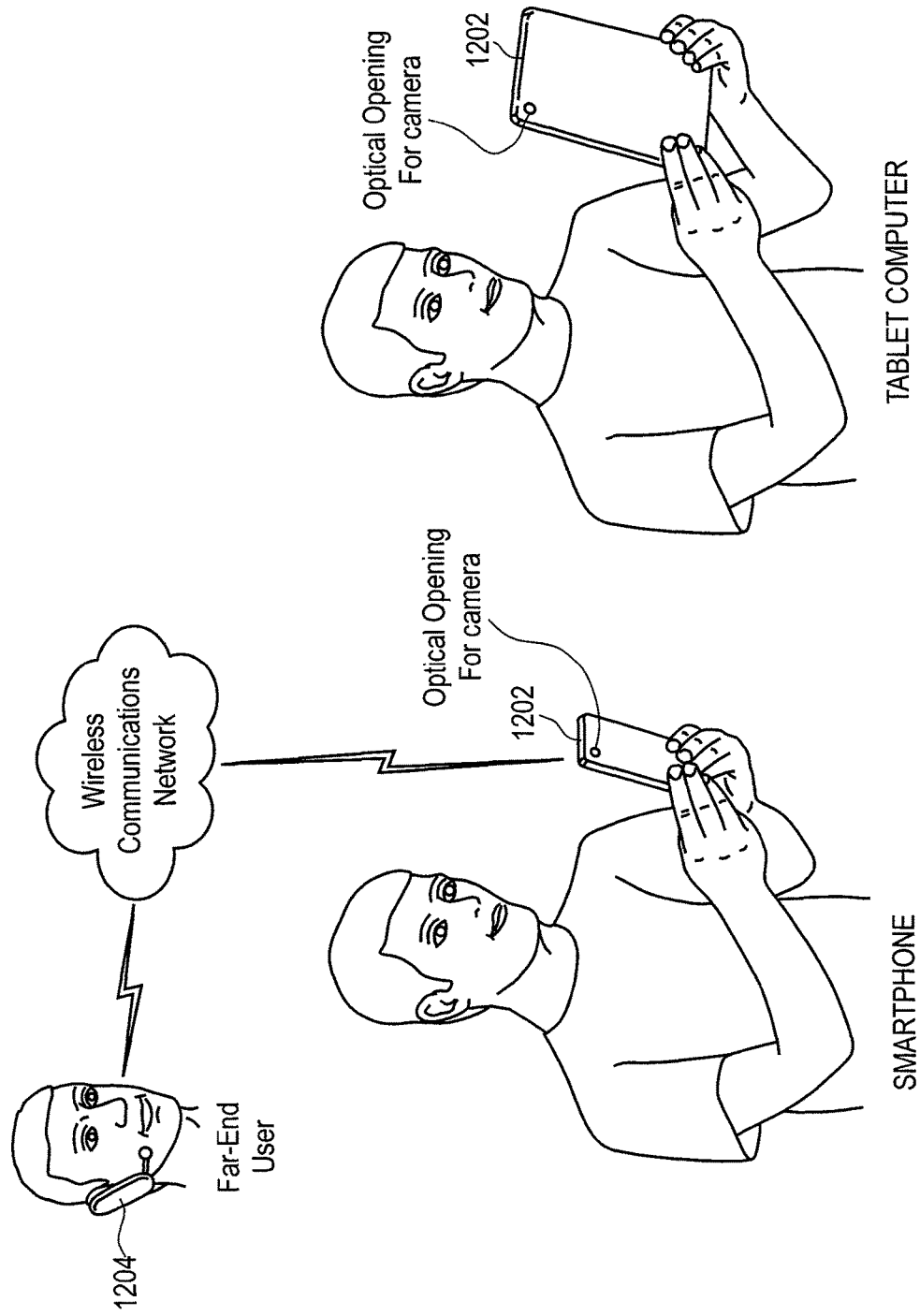
FIG. 12 illustrates one embodiment of a simplified schematic view of one embodiment of an electronic device in which a camera module may be implemented.

FIG. 12 illustrates one embodiment of a simplified schematic view of one embodiment of an electronic device in which a camera module may be implemented. As seen in FIG. 12, a camera module, including a lens barrel such as that disclosed herein, may be integrated within a consumer electronic device 1202 such as a smart phone with which a user can conduct a call with a far-end user of a communications device 1204 over a wireless communications network; in another example, the camera module may be integrated within the housing of a tablet computer. These are just two examples of where the camera module described herein may be used, it is contemplated, however, that the camera module may be used with any type of electronic device in which a camera module is desired, for example, a tablet computer, a desk top computing device or other display device.

Figure 13:
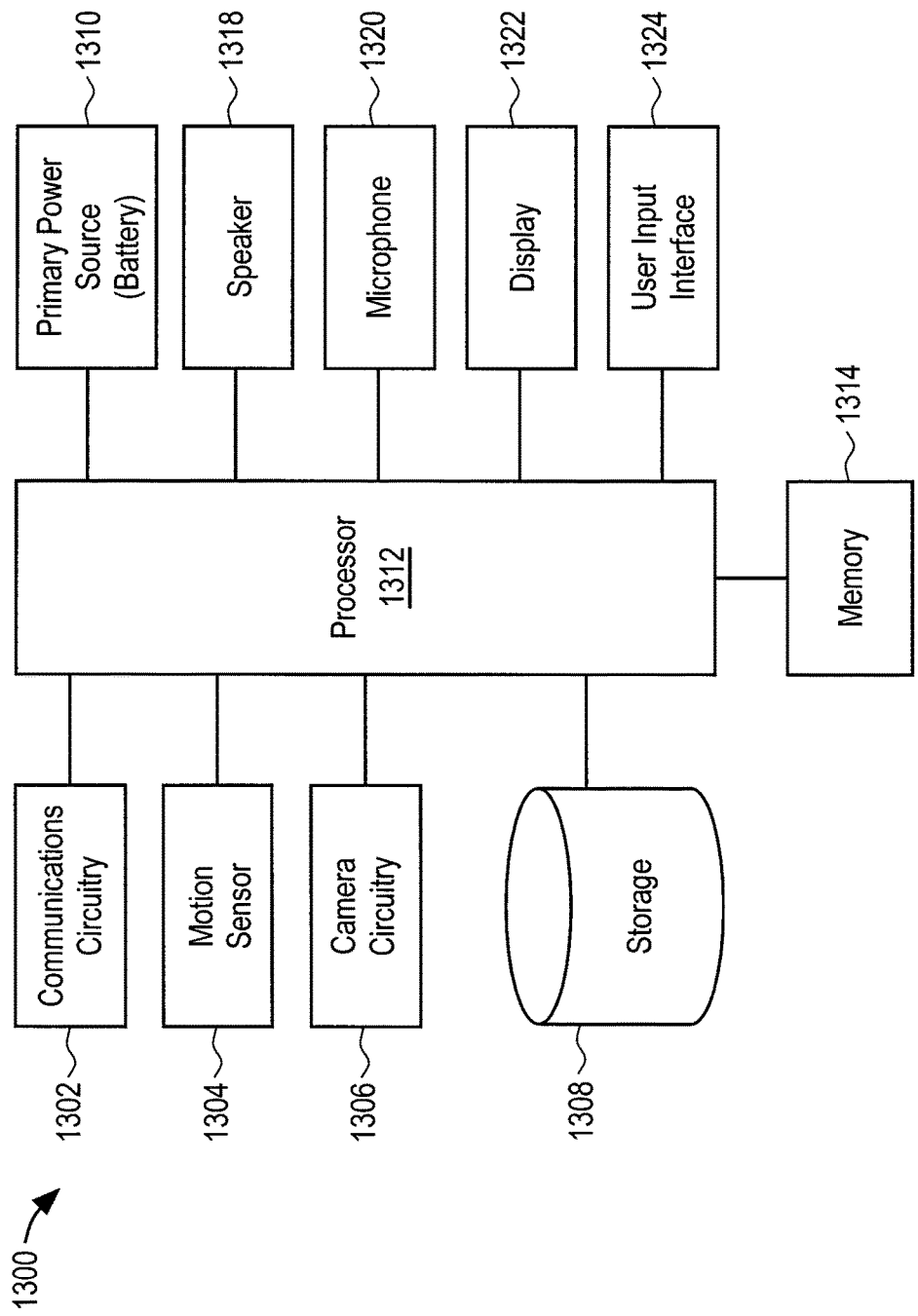
FIG. 13 illustrates a block diagram of some of the constituent components of an embodiment of an electronic device in which an embodiment of the invention may be implemented.

FIG. 13 illustrates a block diagram of some of the constituent components of an embodiment of an electronic device in which an embodiment of the invention may be implemented. Device 1300 may be any one of several different types of consumer electronic devices. For example, the device 1300 may be any camera-equipped mobile device, such as a cellular phone, a smart phone, a media player, or a tablet-like portable computer.

In this aspect, electronic device 1300 includes a processor 1312 that interacts with camera circuitry 1306, motion sensor 1304, storage 1308, memory 1314, display 1322, and user input interface 1324. Main processor 1312 may also interact with communications circuitry 1302, primary power source 1310, speaker 1318, and microphone 1320. The various components of the electronic device 1300 may be digitally interconnected and used or managed by a software stack being executed by the processor 1312. Many of the components shown or described here may be implemented as one or more dedicated hardware units and/or a programmed processor (software being executed by a processor, e.g., the processor 1312).

The processor 1312 controls the overall operation of the device 1300 by performing some or all of the operations of one or more applications or operating system programs implemented on the device 1300, by executing instructions for it (software code and data) that may be found in the storage 1308. The processor 1312 may, for example, drive the display 1322 and receive user inputs through the user input interface 1324 (which may be integrated with the display 1322 as part of a single, touch sensitive display panel). In addition, processor 1312 may send an audio signal to speaker 1318 to facilitate operation of speaker 1318.

Storage 1308 provides a relatively large amount of "permanent" data storage, using nonvolatile solid state memory (e.g., flash storage) and/or a kinetic nonvolatile storage device (e.g., rotating magnetic disk drive). Storage 1308 may include both local storage and storage space on a remote server. Storage 1308 may store data as well as software components that control and manage, at a higher level, the different functions of the device 1300.

In addition to storage 1308, there may be memory 1314, also referred to as main memory or program memory, which provides relatively fast access to stored code and data that is being executed by the processor 1312. Memory 1314 may include solid state random access memory (RAM), e.g., static RAM or dynamic RAM. There may be one or more processors, e.g., processor 1312, that run or execute various software programs, modules, or sets of instructions (e.g., applications) that, while stored permanently in the storage 1308, have been transferred to the memory 1314 for execution, to perform the various functions described above.

The device 1300 may include communications circuitry 1302. Communications circuitry 1302 may include components used for wired or wireless communications, such as two-way conversations and data transfers. For example, communications circuitry 1302 may include RF communications circuitry that is coupled to an antenna, so that the user of the device 1300 can place or receive a call through a wireless communications network. The RF communications circuitry may include a RF transceiver and a cellular baseband processor to enable the call through a cellular network. For example, communications circuitry 1302 may include Wi-Fi communications circuitry so that the user of the device 1300 may place or initiate a call using voice over Internet Protocol (VOIP) connection, transfer data through a wireless local area network.

The device 1300 may include a microphone 1320. In this aspect, microphone 1320 may be an acoustic-to-electric transducer or sensor that converts sound in air into an electrical signal. The microphone circuitry may be electrically connected to processor 1312 and power source 1310 to facilitate the microphone operation (e.g. tilting).

The device 1300 may include a motion sensor 1304, also referred to as an inertial sensor, which may be used to detect movement of the device 1300. The motion sensor 1304 may include a position, orientation, or movement (POM) sensor, such as an accelerometer, a gyroscope, a light sensor, an infrared (IR) sensor, a proximity sensor, a capacitive proximity sensor, an acoustic sensor, a sonic or sonar sensor, a radar sensor, an image sensor, a video sensor, a global positioning (GPS) detector, an RF or acoustic doppler detector, a compass, a magnetometer, or other like sensor. For example, the motion sensor 1304 may be a light sensor that detects movement or absence of movement of the device 1300, by detecting the intensity of ambient light or a sudden change in the intensity of ambient light. The motion sensor 1304 generates a signal based on at least one of a position, orientation, and movement of the device 1300. The signal may include the character of the motion, such as acceleration, velocity, direction, directional change, duration, amplitude, frequency, or any other characterization of movement.

The processor 1312 receives the sensor signal and controls one or more operations of the device 1300 based in part on the sensor signal.

The device 1300 also includes camera circuitry 1306 that implements the digital camera functionality of the device 1300. One or more camera modules having image sensors are built into the device 1300, and each may be located at a focal plane of an optical system that includes a respective lens. An optical image of a scene within the camera's field of view is formed on the image sensor, and the sensor responds by capturing the scene in the form of a digital image or picture consisting of pixels that may then be stored in storage 1308. The camera circuitry 1306 may also be used to capture video images of a scene.

Device 1300 also includes primary power source 1310, such as a built in battery, as a primary power supply.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A lens barrel for a camera module comprising:
   a cylindrical support member, the cylindrical support member having an annular sidewall and an open center portion, the annular sidewall having a top edge, a bottom edge, an inner surface defining the open center portion and an outer surface, a flange extending from the inner surface into the open center and a plurality of contact regions formed on the top edge of the annular sidewall; and
   a pattern of conductive traces formed in the cylindrical support member, the pattern of conductive traces having a first trace line and a second trace line extending from the bottom edge to the top edge of the annular sidewall, one of the first trace line or the second trace line being formed around the outer surface of the annular sidewall and extending over the top edge to every other one of the plurality of contact regions within the top edge, and the other of the first trace line or the second trace line being formed around the flange and extending from the flange to a remaining every other one of the plurality of contact regions within the top edge such that contact regions having alternating first trace lines and second trace lines are formed around the top edge.

2. The lens barrel of claim 1 wherein the plurality of contact regions are evenly spaced recesses formed within the top edge of the annular sidewall.

3. The lens barrel of claim 1 wherein the first trace line is electrically isolated from the second trace line.

4. The lens barrel of claim 1 wherein the first trace line is formed around the outer surface and branches, while running along the outer surface, into a first segment and a second segment, each of which then extend over the top edge to a respective one of every other one of the plurality of contact regions.

5. The lens barrel of claim 1 wherein the first trace line comprises a ring portion formed around a portion of the outer surface of the annular sidewall that is between the top edge and bottom edge and a plurality of inwardly extending trace segments that extend from the ring portion to the every other one of the contact regions.

6. The lens barrel of claim 1 wherein the second trace line forms a ring portion entirely around a top side or a bottom side of the flange and a connecting portion that extends from the ring portion and over the top edge, to the bottom edge of the cylindrical support member.

7. The lens barrel of claim 1 wherein the second trace line forms a ring portion around a top side or a bottom side of the flange and comprises a plurality of trace segments extending outwardly from the ring portion to the every other one of the contact regions.

8. The lens barrel of claim 1 wherein the alternating first trace lines and second trace lines at the contact regions are configured to contact alternating positive terminal pads and negative terminal pads, respectively, formed around an electro-optic lens filter operable to be positioned at the top edge of the lens barrel.

9. The lens barrel of claim 1 wherein at least one of the first trace line or the second trace line is formed by a laser direct structuring (LDS) process.

10. A lens barrel for a camera module comprising:
a cylindrical support member, the cylindrical support member having an annular sidewall and an open center portion, the annular sidewall having a top edge, a bottom edge, an inner surface defining the open center portion, an outer surface and a plurality of evenly spaced contact regions along the top edge of the annular sidewall;
a first conductive trace, the first conductive trace being formed around the outer surface and having a plurality of first conductive trace segments extending from the outer surface to every other one of the evenly spaced contact regions within the top edge; and
a second conductive trace, the second conductive trace being within the open center portion defined by the inner surface and having a plurality of second conductive trace segments extending from the inner surface to a remaining every other one of the evenly spaced contact regions within the top edge such that the first conductive trace and the second conductive trace are electrically isolated from one another.

11. The lens barrel of claim 10 wherein the first conductive trace is operable to carry a positive electrical signal and the second conductive trace is operable to carry a negative electrical signal.

12. The lens barrel of claim 10 wherein the second conductive trace is formed along a top side of a flange extending from the inner surface.

13. The lens barrel of claim 10 wherein the contact regions comprise connecting pads operable to contact electrodes formed around an electro-optic lens filter operable to be positioned at the top edge of the lens barrel.

14. The lens barrel of claim 10 wherein the first conductive trace and the second conductive trace are molded into the cylindrical support member.

15. A camera module comprising:
a camera module carrier having a lens actuator attached thereto, the camera module carrier having at least two conductive carrier traces formed therein and electrically connected to at least two electrical contact points of the lens actuator;
a lens barrel connected to the camera module carrier, the lens barrel having a plurality of contact regions formed within a top edge of the lens barrel, and a first conductive barrel trace and a second conductive barrel trace formed along a sidewall of the lens barrel and extending over the top edge of the lens barrel, wherein the first conductive barrel trace extends to every other one of the plurality of contact regions in the top edge and the second conductive barrel trace is concentrically inward to the first conductive barrel trace and extends to a remaining every other one of the plurality of contact regions in the top edge, and wherein the first conductive barrel trace and the second conductive barrel trace are electrically connected to respective ones of the at least two conductive carrier traces such that electrical signals can be routed between the camera module carrier and the lens barrel; and
an electronic device positioned on the lens barrel, the electronic device being electrically connected to the lens actuator by the camera module carrier and the lens barrel.

16. The camera module of claim 15 wherein the electronic device is an electrically activated lens filter.

17. The camera module of claim 15 wherein the electronic device comprises a circular profile and a plurality of electrodes evenly spaced around an outer circumference, wherein the plurality of electrodes align with the plurality of contact regions of the lens barrel.

18. The camera module of claim 15 wherein the first conductive barrel trace and the second conductive barrel trace are electrically isolated from one another.

19. The camera module of claim 15 wherein the first conductive barrel trace is formed around an outer surface of the lens barrel and the second conductive barrel trace is formed around an inner surface of the lens barrel, the second conductive barrel trace comprises a ring portion and a plurality of trace segments extending outwardly from the ring portion to the remaining every other one of the plurality of contact regions in the top edge.

20. The camera module of claim 15 wherein the lens actuator is a voice coil motor having four springs, wherein the at least two of the electrical contact points connected to the at least two conductive carrier traces are formed by two of the springs and are operable to route an electrical signal to the electronic device and the remaining electrical contact points are formed by the other two springs and are operable to route an electrical signal to the voice coil motor to drive an auto focus operation or an image stabilization operation of the camera module.

* * * * *